United States Patent
Mathison et al.

(10) Patent No.: US 10,958,574 B2
(45) Date of Patent: *Mar. 23, 2021

(54) SYSTEMS AND METHODS FOR PROVIDING EXTERNAL SERVICES TO CORE NETWORK TRAFFIC

(71) Applicant: Verizon Patent and Licensing Inc., Arlington, VA (US)

(72) Inventors: James Mathison, Warren, NJ (US); Barry F. Hoffner, Bridgewater, NJ (US)

(73) Assignee: Verison Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/558,811

(22) Filed: Sep. 3, 2019

(65) Prior Publication Data

US 2019/0394125 A1 Dec. 26, 2019

Related U.S. Application Data

(63) Continuation of application No. 15/905,612, filed on Feb. 26, 2018, now Pat. No. 10,439,935.

(51) Int. Cl.
*H04L 12/741* (2013.01)
*H04W 8/24* (2009.01)
*H04L 12/26* (2006.01)

(52) U.S. Cl.
CPC .......... *H04L 45/74* (2013.01); *H04L 43/0876* (2013.01); *H04W 8/24* (2013.01)

(58) Field of Classification Search
CPC ............ H04L 1/24; H04L 49/25; H04L 69/22
See application file for complete search history.

(56) References Cited

U.S. PATENT DOCUMENTS

| | | |
|---|---|---|
| 6,674,743 B1 | 1/2004 | Amara et al. |
| 8,224,334 B1 | 7/2012 | White et al. |
| 8,756,337 B1 | 6/2014 | Canion et al. |
| 2003/0235168 A1 | 12/2003 | Sharma et al. |
| 2004/0228274 A1 | 11/2004 | Yazaki et al. |
| 2007/0110048 A1 | 5/2007 | Voit et al. |
| 2007/0156919 A1 | 7/2007 | Potti et al. |
| 2009/0129271 A1 | 5/2009 | Ramankutty et al. |
| 2009/0292805 A1 | 11/2009 | Cooper |
| 2010/0149977 A1 | 6/2010 | Johnson et al. |
| 2012/0026897 A1 | 2/2012 | Guichard et al. |
| 2012/0082073 A1 | 4/2012 | Andreasen et al. |
| 2013/0021933 A1 | 1/2013 | Kovvali et al. |

(Continued)

*Primary Examiner* — Melanie Jagannathan

(57) ABSTRACT

A network device, such as a Packet Data Network (PDN) Gateway (PGW), may receive network traffic, determine traffic processing services associated with a subscriber corresponding to the traffic, and identify a sequence of external traffic processing components to provide traffic processing services as though the external traffic processing components where part of the core network. The network device may modify the traffic in accordance with the sequence of external traffic processing components and forward the traffic to the first external traffic processing component of the sequence. The network device may later receive the traffic from the last external traffic processing component of the sequence, process the traffic in accordance with instructions provided by the external traffic processing components, and forward the traffic in accordance with a destination address of the traffic.

20 Claims, 9 Drawing Sheets

(56) References Cited

U.S. PATENT DOCUMENTS

| | | |
|---|---|---|
| 2013/0128896 A1 | 5/2013 | Munoz |
| 2014/0066052 A1 | 3/2014 | Chang et al. |
| 2014/0112133 A1 | 4/2014 | Xia |
| 2014/0351442 A1 | 11/2014 | Fernandez-Palacios et al. |
| 2016/0191395 A1 | 6/2016 | Bao et al. |
| 2016/0323193 A1 | 11/2016 | Zhou et al. |
| 2016/0381699 A1 | 12/2016 | Rubin et al. |
| 2018/0069798 A1 | 3/2018 | Bacik et al. |
| 2018/0091432 A1 | 3/2018 | Ma et al. |
| 2018/0287903 A1 | 10/2018 | Joshi et al. |

SYSTEMS AND METHODS FOR PROVIDING EXTERNAL SERVICES TO CORE NETWORK TRAFFIC

CROSS-REFERENCE TO RELATED APPLICATION

This application is a Continuation of co-pending U.S. patent application Ser. No. 15/905,612, filed Feb. 26, 2018, titled "SYSTEMS AND METHODS FOR PROVIDING EXTERNAL SERVICES TO CORE NETWORK TRAFFIC," the contents of which are hereby incorporated by reference.

BACKGROUND

Wireless telecommunication networks often include User Equipment (UE) (e.g., smartphones, tablet computers, laptop computers, etc.) that communicate with Radio Access Network (RAN) nodes (e.g., base stations) to connect to, and register with, a core network. Doing so may provide UEs with access to a variety of network services, such as voice calls, text messages, Internet access, and other data services (e.g., video streaming, content filtering, etc.). These services may be provided by systems and devices located in the wireless telecommunication network itself (e.g., within the core network) or from an external device (e.g., a device accessible via the Internet).

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

DETAILED DESCRIPTION OF PREFERRED EMBODIMENTS

Figure 1A:
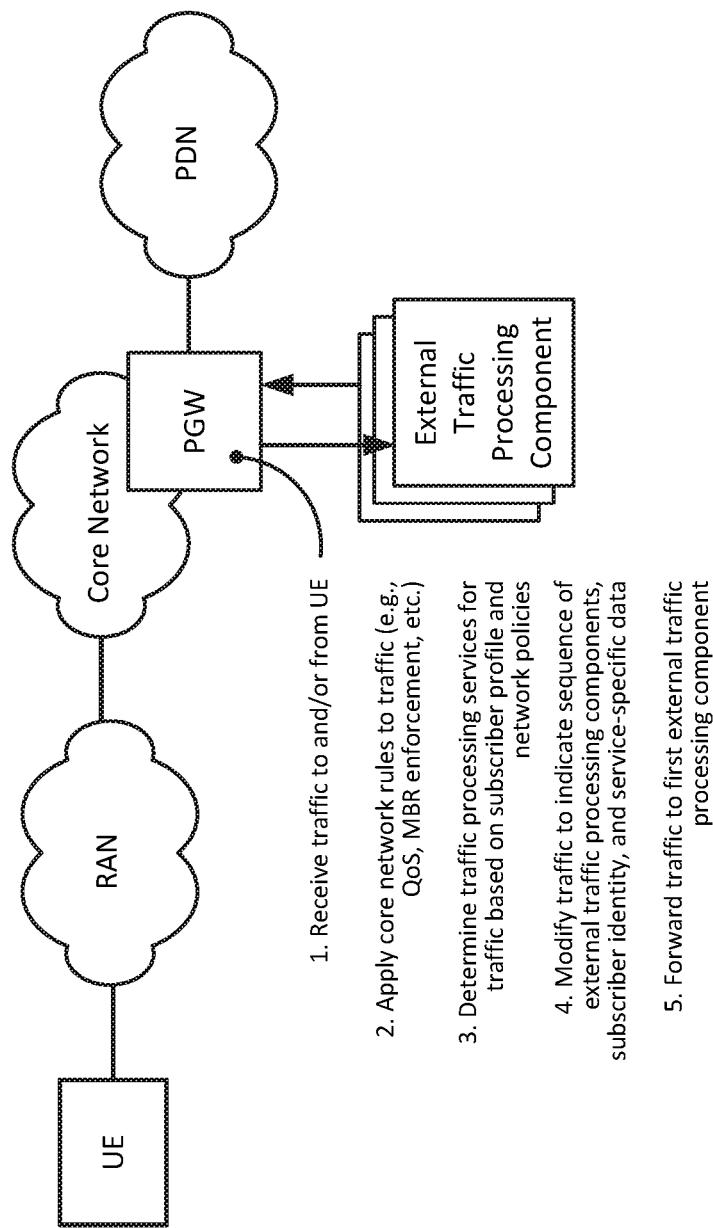
FIGS. 1A and 1B illustrate an overview of one or more embodiments described herein.

The following detailed description refers to the accompanying drawings. The same reference numbers in different drawings may identify the same or similar elements. It is to be understood that other embodiments may be utilized, and structural or logical changes may be made without departing from the scope of the present disclosure. Therefore, the following detailed description is not to be taken in a limiting sense, and the scope of embodiments in accordance with the appended claims and their equivalents.

The techniques described herein may enable a wireless telecommunication network to efficiently and dynamically provide external network services to core network data traffic as though the external network services were being provided by devices within the core network itself. For example, when a core network device (such as a Packet Data Network (PDN) Gateway (PGW)) receives traffic (e.g., a data packet originating from, or addressed to, a User Equipment (UE)), the PGW may determine a subscriber profile associated with the traffic and, based on the subscriber profile, determine which network services are to be applied to the traffic.

The network services may be referred to herein as "traffic processing services," which may be viewed as a way to add value to the overall network. Examples of traffic processing services may include security services, content filtering services, etc. Additionally, such services may be provided by services and/or devices (referred to herein as "external traffic processing components") that are external to the core network (e.g., servers that are operated, managed, maintained, etc., by a different organization than that of the core network, and/or which are accessible via a network that is accessed via messaging that traverses a network external to the core network (e.g., a PDN, such as the Internet)). Further, traffic processing services may be services that are provided in addition to other types of network services provided by the core network itself, such as charging policies services, data usage monitoring services, Quality of Service (QoS) functions, Maximum Bit Rate (MBR) enforcement, etc.

Based on the network services associated with the subscriber profile, the PGW may determine which external traffic processing components should receive the traffic (e.g., packets that are destined to and/or from a UE) and modify the traffic (e.g., may add header information) to indicate which external traffic processing components should perform additional processing on the traffic. In some embodiments, as described below, the PGW may determine a sequence in which the external traffic processing components should process the traffic. The PGW may also include other information, such as an indication of the subscriber to which the traffic corresponds and information that may be helpful in enabling the external traffic processing components to provide the traffic processing services. The PGW may then forward the traffic to the first external traffic processing component of the sequence of external traffic processing components, and the first external traffic processing component may process the traffic in accordance with the traffic processing service provided thereby. The first external traffic processing component may then forward the traffic to the second external traffic processing component indicated in the traffic (e.g., in a data packet header), and so on, until each external traffic processing component indicated in the sequence of external traffic processing components has processed the traffic. The last external traffic processing component in the sequence may forward the traffic back to the PGW, and the PGW may further process the traffic by, for example, applying instructions provided by the external traffic processing components, applying core network rules and/or policies to the traffic, and forwarding the traffic to a device originally intended to receive the traffic.

As such, the techniques described herein may enable network services to be efficiently added and/or removed from the network services provided by a core network, by providing a way for a core network to determine a customized set of network services corresponding to network traffic (e.g., based on a corresponding subscriber profile), identify the external traffic processing components associated with providing the network services, and modify the traffic to ensure that the traffic is processed by the external components and then returned to the core network for additional processing. Using the techniques described herein, a network operator may provide additional network services without incurring the costs and risks (e.g., time, capital, labor, etc.) of developing and deploying proprietary network services and devices. Instead, network services may be added or removed from the network with minimal modification to internal processes of the network.

Figure 1B:
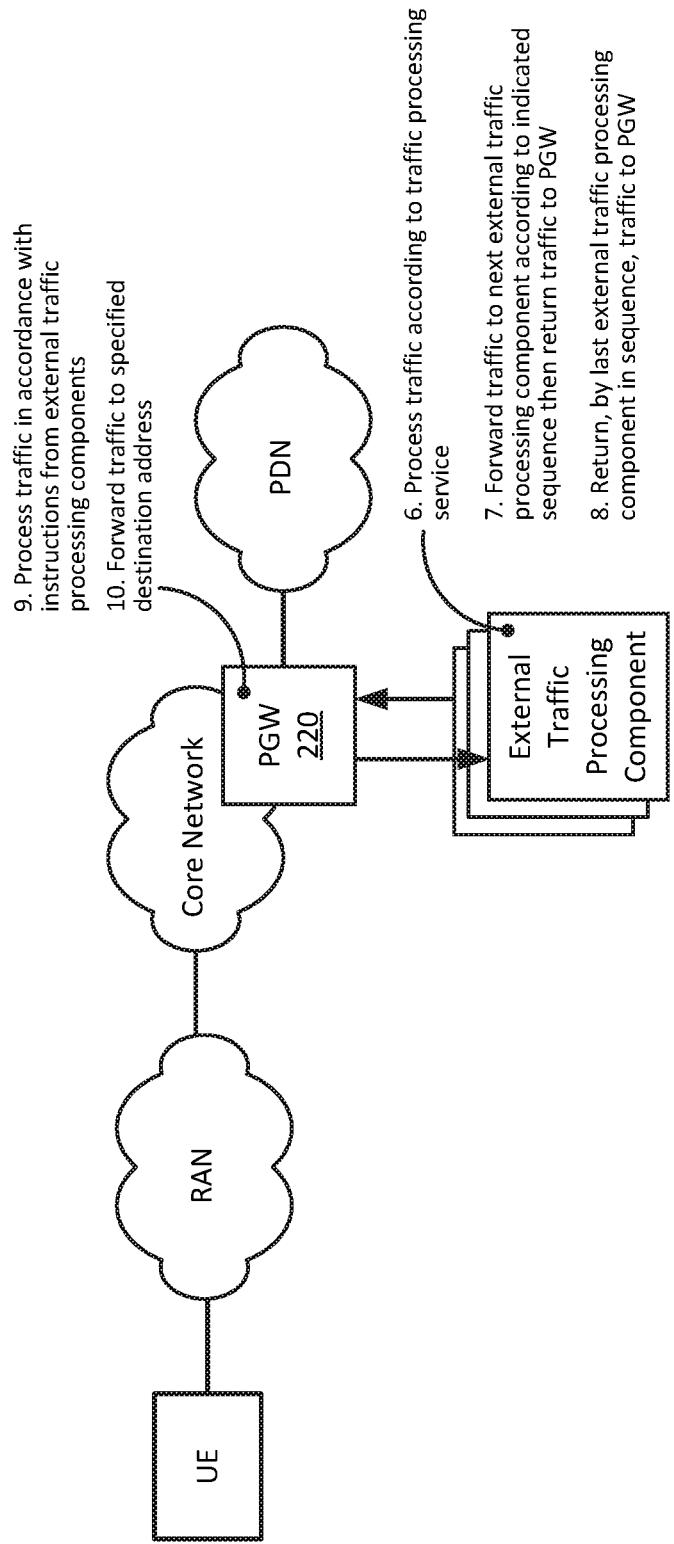

FIGS. 1A and 1B illustrate an overview of one or more embodiments described herein. As shown in FIG. 1A, the PGW of a telecommunications network may receive (at 1) traffic (e.g., one or more packets) headed in the uplink (UL) direction (e.g., traffic originating from the UE) or the downlink (DL) direction (e.g., traffic destined for the UE). The PGW may identify that the recipient or sender of the traffic is the UE, based on information in a General Packet Radio Service (GPRS) Tunneling Protocol (GTP) header, such as Tunnel Endpoint Identifier (TEID) in the GTP header.

Based on identifying that the traffic is associated with (e.g., sent from or destined to) the UE, the PGW may apply (at 2) core network rules to the traffic (e.g., QoS policies, MBR policies, etc.). These core network rules may be enforced on a per-UE basis (e.g., different UEs may be associated with different core network rules).

Additionally, the PGW may determine (at 3) traffic processing services to be applied to the traffic based on a subscriber profile of the UE. For example, as mentioned above, the PGW may identify the particular UE based on information in a GTP header of the traffic (e.g., a TED and/or other information). In some embodiments, the PGW may identify other identifying information, such as an IMSI of the UE, based on a mapping of IMSI values to TEIDs. In some embodiments, the PGW may identify that the traffic is destined to the UE, based on an IP address in an IP header of the traffic (i.e., when the destination IP address of the traffic matches an IP address of the UE).

The PGW may identify a subscriber profile of the UE (e.g., using the IMSI of the UE), which may include an indication of the traffic processing services applicable to the traffic. The PGW may modify (at 4) the traffic to indicate one or more external traffic processing components that should perform additional processing on the traffic. For example, the PGW may modify the traffic by adding header information (e.g., may add a Network Services Action Header (NSAH), described in more detail below), which indicates one or more traffic processing services to be performed, an identifier of the UE (e.g., the IMSI of the UE and/or one or more other identifiers), or the like. In some embodiments, the NSAH may be added in addition to one or more existing headers (e.g., may be added to, or may encapsulate, an Internet Protocol (IP) packet which includes an IP header).

In some embodiments, the PGW may modify the traffic (e.g., add header information) to indicate a specified sequence of external traffic processing components to provide the traffic processing services. The PGW may then send (at 5) the traffic to the external traffic processing components (e.g., to the first external traffic processing component in the sequence of external traffic processing components indicated in the modified traffic).

Referring to FIG. 1B, each external traffic processing component may receive the traffic and apply (at 6) the traffic processing service associated with that external traffic processing component. Additionally, each external traffic processing component may forward (at 7) the traffic to another external traffic processing component (e.g., the next external traffic processing component, which may be indicated by the sequence previously determined by the PGW). The last external traffic processing component, in the sequence of external traffic processing components, may return the traffic to the PGW (at 8).

In some embodiments, one or more of the external traffic processing components may have modified the traffic by including instructions about how the core network (e.g., the PGW) should manage, handle, or otherwise process the traffic further. For example, an external traffic processing component providing a data filtering service (e.g., a service related to enforcing MBR, congestion control, and/or other services related to dropping packets) may modify the traffic (e.g., by adding or modifying header information) by indicating whether, how, etc., the traffic should be filtered (e.g., by indicating that one or more portions of the traffic, such as one or more packets, should be deleted or "dropped") by the PGW. In some embodiments, one or more of the external traffic processing components may drop packets themselves (e.g., without needing to instruct the PGW to drop the packets).

Once the PGW receives the processed traffic from the external traffic processing components (e.g., traffic that has been processed by the external traffic processing components), the PGW may process (at 9) the traffic in accordance with any instructions that may have been provided by the external traffic processing components. For instance, the PGW may, based on the instructions, modify QoS values, queue weight values, and/or other parameters related to processing the traffic. Additionally, the PGW may forward (at 10) the traffic according to a destination of the traffic (e.g., to the UE, an external device via the Internet, etc.).

Figure 2:
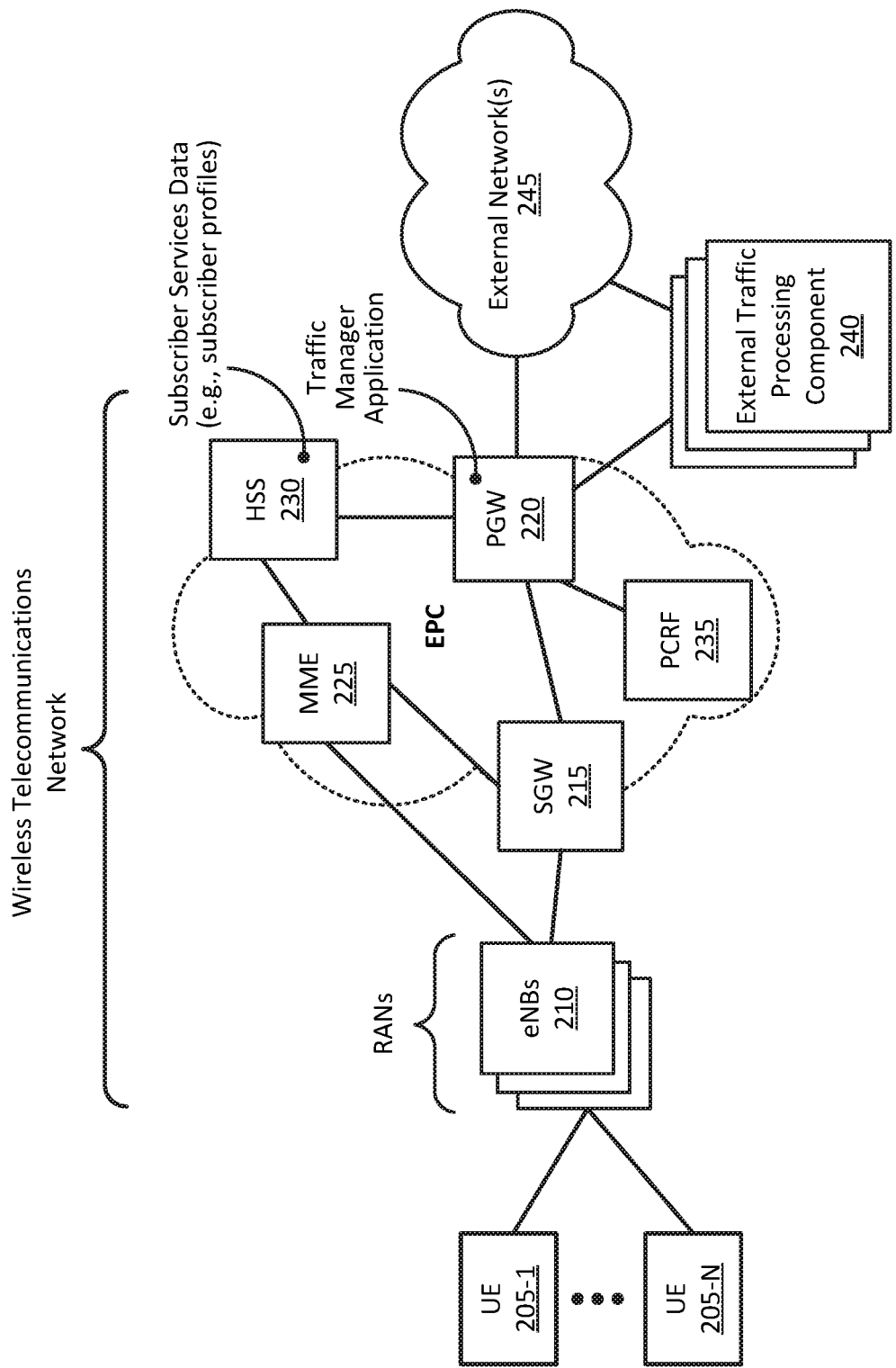
FIG. 2 illustrates an example environment in which one or more embodiments, described herein, may be implemented.

FIG. 2 is a diagram of an example environment 200 in which systems and/or methods described herein may be implemented. Environment 200 may include UEs 205-1 through UE 205-N (referred to individually as "UE 205" and collectively as "UEs 205"), one or more RANs, a wireless telecommunications network, and one or more external networks. The wireless telecommunications network may include an Evolved Packet System (EPS) that includes a Longer-Term Evolution (LTE) network and/or an evolved packet core (EPC) network that operates based on a 3rd Generation Partnership Project (3GPP) Wireless Communication Standard. The LTE network may be, or may include, one or more base stations, some or all of which may take the form of enhanced Node Bs (eNBs) 210, via which UEs 205 may communicate with the EPC network.

The EPC network may include Serving Gateway (SGW) 215, PGW 220, Mobility Management Entity (MME) 225, Home Subscriber Server (HSS) 230, and/or Policy and Charging Rules Function (PCRF) 235. As shown, the EPC network may enable UEs 205 to communicate with external network 245, such as a Public Land Mobile Networks (PLMN), a Public Switched Telephone Network (PSTN), and/or an IP network (e.g., the Internet). The EPC network may also be connected (e.g., via PGW 220) to one or more external traffic processing components 240.

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another one or more of the devices of environments 200. Devices of environment 200 may interconnect with each other and/or other devices via wired connections, wireless connections, or a combination of wired and wireless connections. In some implementations, one or more devices of environment 200 may be physically integrated in, and/or may be physically attached to, one or more other devices of environment 200.

UE 205 may include a portable computing and communication devices, such as a personal digital assistant (PDA), a smart phone, a cellular phone, a laptop computer with connectivity to the wireless telecommunications network, a tablet computer, etc. UE 205 may also include a non-portable computing device, such as a desktop computer, a consumer or business appliance, a smart television, or another device that can connect to the wireless telecommunications network. UE 205 may also include, and/or be communicatively coupled to, a computing and communication device that may be worn by a user (also referred to as wearable devices) such as a watch, a fitness band, a necklace, glasses, an eyeglass, a ring, a belt, a headset, or another type of wearable device.

eNB 210 may include one or more network devices that receive, process, and/or transmit traffic, such as voice calls and data, destined for and/or received from UE 205. eNB 210 may receive traffic from and/or send traffic to external networks or other devices via SGW 215 and PGW 220. eNB 210 may send traffic to and/or receive traffic from UEs 205 via an air interface.

SGW 215 may aggregate traffic received from one or more eNBs 210 and may send the aggregated traffic to another network or device via PGW 220. Additionally, SGW 215 may aggregate traffic received from one or more PGWs 220 and may send the aggregated traffic to one or more eNBs 210. SGW 215 may operate as an anchor for the user plane during inter-eNB handovers and as an anchor for mobility between different telecommunication networks.

PGW 220 may include one or more network devices that may aggregate traffic received from one or more SGWs 215 and may send the aggregated traffic to an external network or another device. PGW 220 may also, or alternatively, receive traffic from an external network and may send the traffic toward UE 205 (via SGW 215 and/or eNB 210). PGW 220 may assign an IP address (e.g., a temporary IP address) to UE 205 as part of a network connection and registration procedure involving UE 205. The IP address assigned to UE 205 may be associated with an IMSI of UE 205 and/or another type of UE identifier, and a record of the IP address assigned to UE 205 may be stored and made available to devices of the EPC, such as HSS 230, PGW 220, etc.

PGW 220 may include a traffic manager application that may enable PGW 220 to operate in accordance with one or more of the techniques described herein. For example, the traffic manager application may enable PGW 220 to determine traffic processing services to be applied to traffic, modify the traffic to indicate external traffic processing components 240 to provide the traffic processing services, and cause the traffic to be sent to, and processed by, each external traffic processing component 240.

MME 225 may include one or more computation and communication devices that act as a control node for eNB 210 and/or other devices that provide the air interface for the wireless telecommunications network. For example, MME 225 may perform operations to register UE 205 with the wireless telecommunications network, to establish bearer channels (e.g., traffic flows) associated with a session with UE 205, to hand off UE 205 to a different eNB 210, MME 225, or another network, and/or to perform other operations.

HSS 230 may include one or more devices that may manage, update, and/or store, in a memory associated with HSS 230, profile information associated with a subscriber (e.g., a subscriber associated with UE 205). The profile information may identify applications and/or services (e.g., subscriber services data) that have been enabled, or otherwise accessible, to the subscriber; a Mobile Directory Number (MDN) and/or IMSI associated with the subscriber; bandwidth or data rate thresholds associated with the applications and/or services; and/or other information. Additionally, or alternatively, HSS 230 may perform authentication, authorization, and/or accounting operations associated with the subscriber and/or a communication session with UE 205.

PCRF 235 may include one or more devices that may receive information regarding network policies and/or subscriptions from one or more sources, such as subscriber databases and/or from one or more users. PCRF 235 may provide these policies to PGW 220 or another device so that the policies can be enforced. As depicted, in some implementations, PCRF 235 may communicate with PGW 220 to ensure that charging policies are properly applied to communication sessions between UE 205 and the wireless telecommunication network.

External traffic processing component 240 may include one or more computation and communication devices that provide a network service (e.g., a traffic processing service) for, on behalf of, etc., the wireless telecommunication network. External traffic processing component 240 may be implemented as an external device with respect to the EPC (e.g., may be deployed, operated, managed, maintained, etc., by a different organization than that of the EPC). As described herein, this may generally involve PGW 220 sending traffic to certain external traffic processing components 240, and later receiving processed traffic back from the external traffic processing components 240, prior to sending the traffic to a destination device (e.g., UE 205) and/or network (e.g., the Internet) that is external to the EPC. Additionally, external traffic processing component 240 and PGW 220 may communicate with one another via an external network and/or some other sort of interface that does not traverse an external network, such as the Internet.

Figure 3:
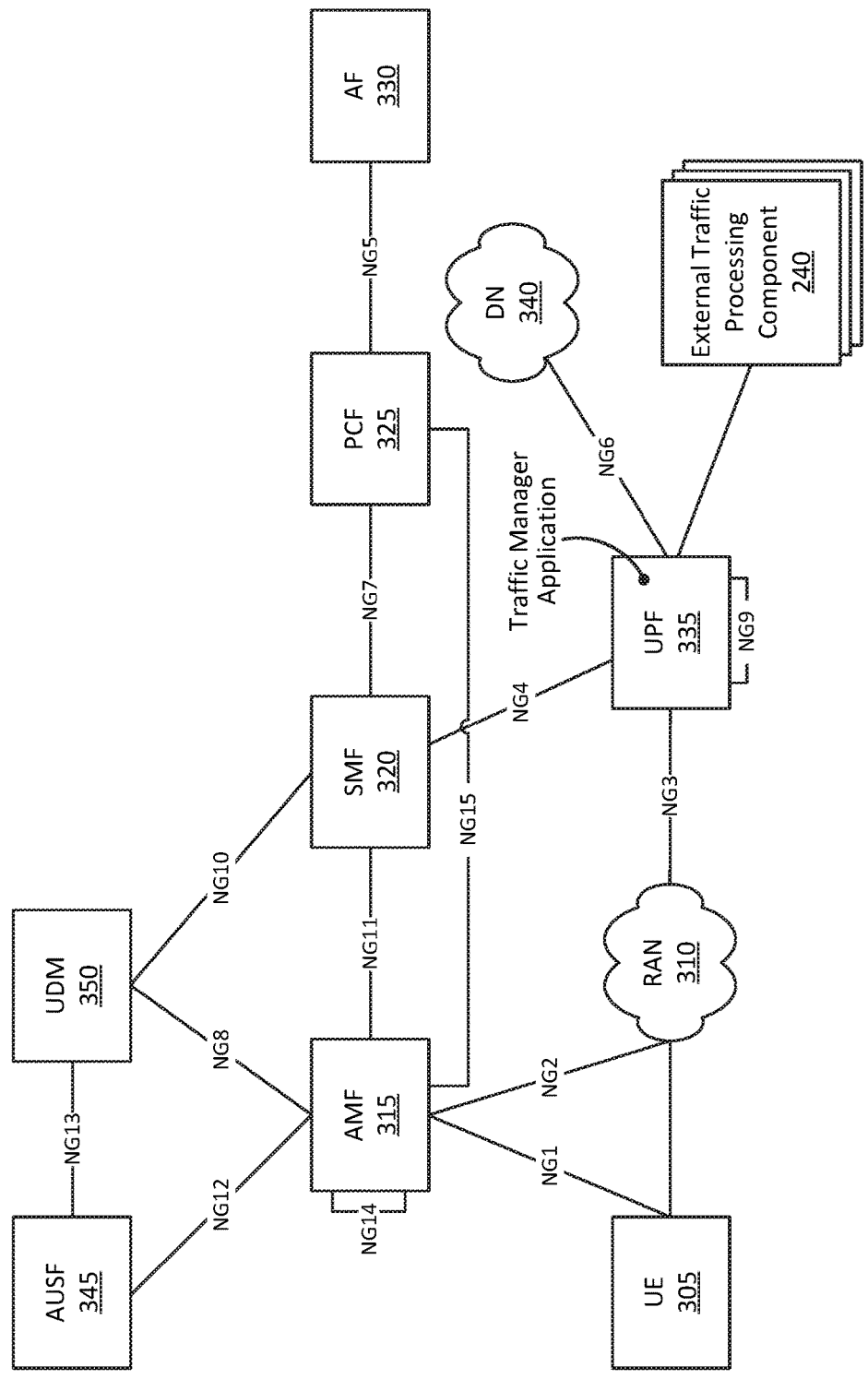
FIG. 3 illustrates another example environment in which one or more embodiments, described herein, may be implemented.

FIG. 3 illustrates an example of another environment 300, in which one or more embodiments, described herein, may be implemented. Generally, environment 300 may be a 5th Generation (5G) (or New Radio (NR)) network of the 3GPP Wireless Communication Standard, and/or may include elements of a 5G network. The representation shown in FIG. 3 may be a reference point representation of the 5G network, in which the interactions between various network functions are shown. These interactions are represented here as interfaces NG1 through NG15, and NGCH. It may be possible to represent environment 300 in other ways (e.g., a service-based representation), but these other representations are not described herein for the sake of brevity.

Some of the devices of FIG. 3 may be similar to some of the devices described above with respect to FIG. 2. For example, UE 205 and eNB 210, of FIG. 2, may be similar to UE 305 and RAN 310 of FIG. 3, respectively. In some embodiments, eNB 210 and RAN 310 may be implemented as one base station capable of operating in accordance with both LTE and 5G Radio Access Technologies (RATs). Similarly, UE 205 and UE 305 may be implemented by one UE that is capable of implementing both LTE and 5G RATs. For example, when 5G connectivity is not available, the UE may alternatively connect the network using LTE RAT. As such, the systems, devices, and processes of example environments 200 and 300 may not be exclusive to one another and may overlap depending on a given implementation and scenario. For clarity, the techniques described herein may primarily be described within the context of the devices of environment 200; however, these techniques may also be implemented by the network functions of environment 300.

As shown in FIG. 3, environment 300 may include UE 305, RAN 310, Access and Mobility Management Function (AMF) 315, SMF 320, Policy Control Function (PCF) 325, Application Function (AF) 330, User Plane Function (UPF) 335, Data Network (DN) 340, Authentication Server Function (AUSF) 345, and Unified Data Management (UDM) 350. Environment 300 may also include, or be capable of communicating with, external traffic processing components 240, which have been described above with reference to FIG. 2.

The quantity of devices and/or networks, illustrated in FIG. 3, is provided for explanatory purposes only. In practice, environment 300 may include additional devices and/or networks; fewer devices and/or networks; different devices and/or networks; or differently arranged devices and/or networks than illustrated in FIG. 3. For example, while not shown, environment 300 may include devices that facilitate or enable communication between various components shown in environment 300, such as routers, modems, gateways, switches, hubs, etc. Alternatively, or additionally, one or more of the devices of environment 300 may perform one or more functions described as being performed by another one or more of the devices of environments 300. Devices of environment 300 may interconnect with each other and/or other devices via wired connections, wireless connections, or a combination of wired and wireless connections. In some implementations, one or more devices of environment 300 may be physically integrated in, and/or may be physically attached to, one or more other devices of environment 300.

UE 305 may include any computation and communication device that is capable of communicating with one or more networks (e.g., RAN 310 and/or DN 340). For example, UE 305 may include a device that receives content, such as web pages (e.g., that include text content and/or image content), streaming audio and/or video content, and/or other content, via an Internet connection and/or via some other delivery technique. In some implementations, UE 305 may be, may include, or may be a logical portion of, a radiotelephone, a personal communications system (PCS) terminal (e.g., a device that combines a cellular radiotelephone with data processing and data communications capabilities), a personal digital assistant (PDA) (e.g., a device that includes a radiotelephone, a pager, etc.), a smart phone, a laptop computer, a tablet computer, a camera, a television, a personal gaming system, a wearable device, and/or another type of computation and communication device.

RAN 310 may be, or may include, a 5G RAN that includes one or more base stations, via which UE 305 may communicate with one or more other elements of environment 300. UE 305 may communicate with the RAN via an air interface. For instance, RAN 310 may receive traffic (e.g., voice call traffic, data traffic, messaging traffic, signaling traffic, etc.) from UE 305 via the air interface, and may communicate the traffic to AMF 315, UPF 335, and/or one or more other devices or networks. Similarly, RAN 310 may receive traffic intended for UE 305 (e.g., from AMF 315, UPF 335, and/or one or more other devices or networks) and may communicate the traffic to UE 305 via the air interface.

AMF 315 may include one or more computation and communication devices that perform operations to register UE 305 with the 5G network, to establish bearer channels associated with a session with UE 305, to hand off UE 305 from the 5G network to another network, to hand off UE 305 from the other network to the 5G network, and/or to perform other operations. In some embodiments, the 5G network may include multiple AMFs 315, which communicate with each other via the NG14 interface (denoted in FIG. 3 by the line marked "NG14" originating and terminating at AMF 315).

SMF 320 may include one or more network devices that gather, process, store, and/or provide information in a manner described herein. SMF 320 may, for example, facilitate in the establishment of communication sessions on behalf of UE 305. In some embodiments, the establishment of communications sessions may be performed in accordance with one or more policies provided by PCF 325.

PCF 325 may include one or more devices that aggregate information to and from the 5G network and/or other sources. PCF 325 may receive information regarding policies and/or subscriptions from one or more sources, such as subscriber databases and/or from one or more users (such as, for example, an administrator associated with PCF 325).

AF 330 may include one or more devices that receive, store, and/or provide information that may be used in determining parameters (e.g., QoS parameters, charging parameters, or the like) for certain applications. AF 330 may maintain the information on a per-application basis, in some embodiments.

UPF 335 may include one or more devices that receive, store, and/or provide data (e.g., user plane data). For example, UPF 335 may receive user plane data (e.g., voice call traffic, data traffic, etc.), destined for UE 305, from DN 340, and may forward the user plane data toward UE 305 (e.g., via RAN 310, SMF 320, and/or one or more other devices). In some embodiments, multiple UPFs 335 may be deployed (e.g., in different geographical locations), and the delivery of content to UE 305 may be coordinated via the NG9 interface (e.g., as denoted in FIG. 3 by the line marked "NG9" originating and terminating at UPF 335). Similarly, UPF 335 may receive traffic from UE 305 (e.g., via RAN 310, SMF 320, and/or one or more other devices), and may forward the traffic toward DN 340. In some embodiments, UPF 335 may communicate (e.g., via the NG4 interface) with SMF 320, regarding user plane data processed by UPF 335.

UPF 335 may include a traffic manager application that may cause or enable UPF 335 to operate in accordance with one or more of the techniques described herein. For example, the traffic manager application may enable UPF 335 to determine traffic processing services to be applied to traffic, modify the traffic (e.g., add header information) to indicate external traffic processing components 240 to provide the traffic processing services, and cause the traffic to be sent to, and be processed by, each external traffic processing component 240. Additionally, UPF 335 may communicate with external traffic processing component 240 via an Application Protocol Interface (API) associated with the traffic manager application, which may include or involve one or more of the other devices and/or interfaces depicted in FIG. 3.

DN 340 may include one or more wired and/or wireless networks. For example, DN 340 may include an Internet Protocol (IP)-based PDN, a wide area network (WAN) such as the Internet, a private enterprise network, and/or one or more other networks. UE 305 may communicate, through DN 340, with data servers, application servers, other UEs 305, and/or to other servers or applications that are coupled to DN 340. DN 340 may be connected to one or more other networks, such as a PSTN, a PLMN, and/or another network. DN 340 may be connected to one or more devices, such as content providers, applications, web servers, and/or other devices, with which UE 305 may communicate.

AUSF 345 and UDM 350 may include one or more devices that manage, update, and/or store, in one or more memory devices associated with AUSF 345 and/or UDM 350, profile information associated with a subscriber. AUSF 345 and/or UDM 350 may perform authentication, authorization, and/or accounting operations associated with the subscriber and/or a communication session with UE 305.

Figure 4:
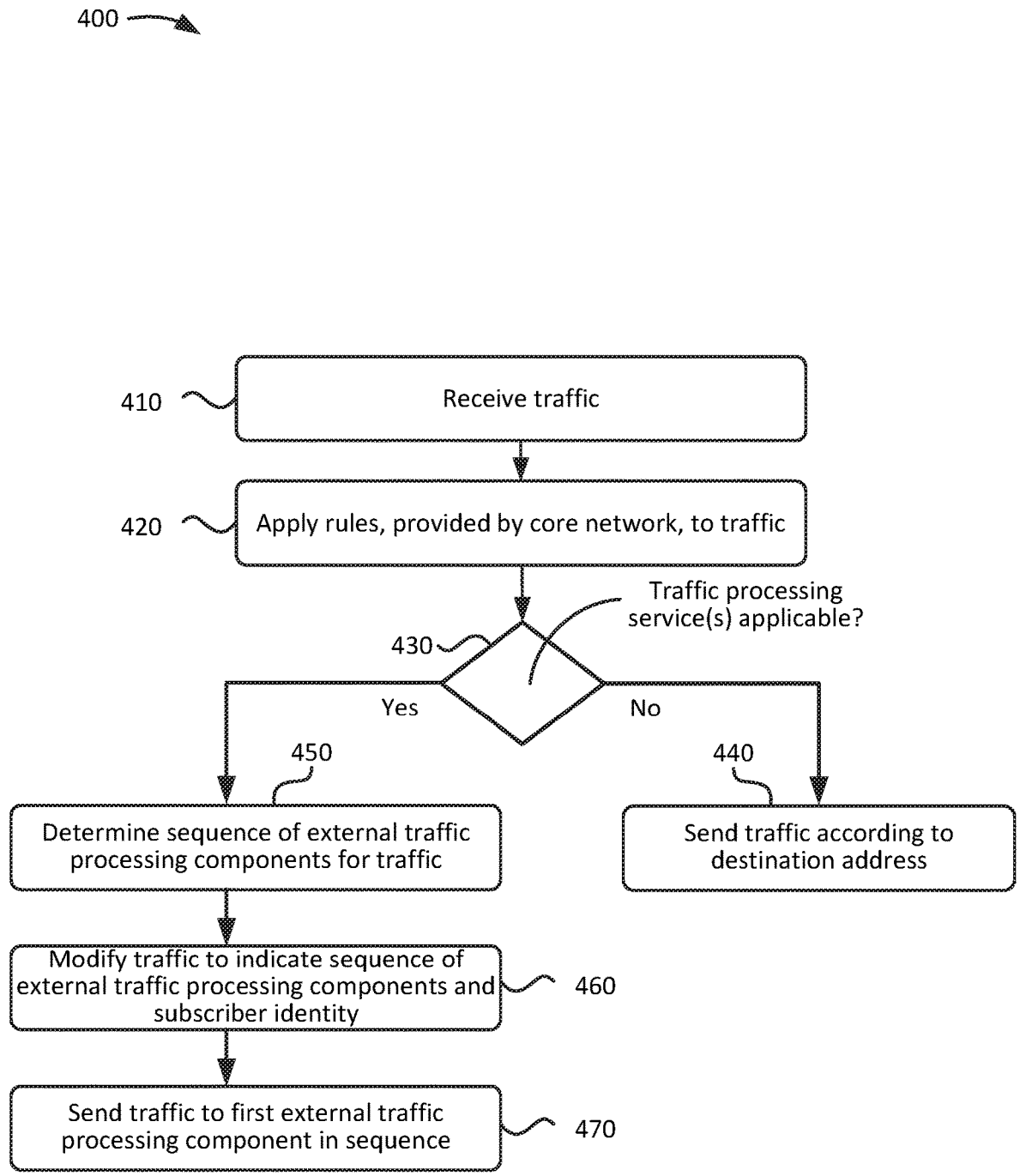
FIG. 4 illustrates an example process for providing traffic to external traffic processing components that provide traffic processing services and operate external to a core network.

FIG. 4 illustrates an example process 400 for providing traffic to external traffic processing components 240 that provide traffic processing services and operate external to a core network. In some embodiments, process 400 may be performed by PGW 220. As such, process 400 is described below with reference to PGW 220 and other devices described above with reference to environment 200 of FIG. 2. In some embodiments, process 400 may additionally, or alternatively, be implemented and performed by other functions and/or devices, such as SMF 320, UPF 335, and/or one or more other devices of environment 300 of FIG. 3. That is, while described below in the context of PGW 220 performing certain operations, in some embodiments, SMF 320 and/or UPF 335 may perform one or more of the operations described below.

As shown, process 400 may include receiving traffic (block 410). For example, PGW 220 may receive traffic that originated from UE 205 and is/are directed (e.g., via a destination addressed of the traffic) to another device, such another UE, an application server, etc., which may be available via an external network, such as the Internet. Alternatively, PGW 220 may receive traffic that originated from an external device (e.g., a device available via an external network, such as the Internet) and that is directed to UE 205.

Process 400 may include applying rules, provided by the core network, to the traffic (block 420). For example, the core network (e.g., the EPC to which PGW 220 corresponds) may include one or more rules, policies, etc., for managing and processing traffic that is received by the core network. Examples of such rules and policies may include rules for monitoring subscriber data usage, implementing billing policies, QoS policies, dropping traffic/packets, etc. As such, prior to forwarding traffic to a device outside the core network, PGW 220 may cause the traffic to undergo one or more types of processing, modification, etc., that are based on the rules and policies implemented (internally) by the core network. Applying a core network rule may involve PGW 220 alone or PGW 220 in combination with one or more other devices, (e.g., PGW 220 may apply rules and/or policies provided by HSS 230, PCRF 235, etc.).

Process 400 may include determining whether one or more traffic processing services are applicable to the traffic (block 430). PGW 220 may determine whether traffic processing services are applicable to network traffic based on an IP address, IMSI, MDN, and/or another type of identifier associated with the traffic. For example, PGW 220 may determine an IP address associated with the traffic (i.e., included in one or more data packets), use the IP address to determine an IMSI associated with the IP address, determine a subscriber profile associated with the IMSI, and determine whether the subscriber profile includes traffic processing services.

When traffic originates from UE 205, PGW 220 may determine the identity of the UE based on GTP header information (e.g., a TEID indicated in the GTP header). When the packet originates from another device and is intended for UE 205, PGW 220 may determine the IP address based on the destination address of the traffic (e.g., the destination IP address indicated in packet headers). PGW 220 may use the IP address, which may have been previously assigned by PGW 220 during a session establishment procedure with UE 205, to determine the IMSI of UE 205. In some embodiments, PGW 220 may use the IMSI to identify the subscriber profile associated with UE 205. PGW 220 may have previously retrieved the subscriber profile (e.g., from HSS 230) during the session establishment procedure with UE 205.

When no traffic processing services are to be provided (block 430—No), process 400 may include sending the traffic according to the destination address (block 440). For example, when the traffic has already been processed in accordance with rules provided by the core network and no external traffic processing services are applicable to the traffic, PGW 220 may proceed to forward the traffic to the device intended to receive the traffic (e.g., based on the destination address of the traffic).

When traffic processing services are applicable (block 430—Yes), process 400 may include determining a sequence of external traffic processing components 240 for the traffic (block 450). For example, PGW 220 may determine a sequence of external traffic processing components 240 that correspond to the traffic processing services to be provided to the traffic. In some embodiments, the sequence of external traffic processing components 240 may include a sequence of the IP addresses of external traffic processing components 240. For example, PGW 220 may include (or otherwise have access to) a database, table, or another type of data structure that logically associates traffic processing services with IP addresses of external traffic processing components 240 that provide each traffic processing service, and PGW 220 may use the data structure to determine a sequence of IP addresses of the external traffic processing components 240 that are to provide the traffic processing services to the traffic.

In some embodiments, determining the sequence of external traffic processing components 240 may also include determining dependencies, or other types of sequence-oriented relationships, which may exist between two or more traffic processing services, and determining the sequence of external traffic processing components 240 for traffic in accordance with the dependencies. For example, assume that one traffic processing service includes a firewall service and another traffic processing service includes a charge-based service (e.g., a service that may charge the subscriber for access to certain content). PGW 220 may determine (e.g., based on rules stored by PGW 220) that the charge-based service may be dependent on whether the traffic is to be blocked by the firewall service (since if the firewall service blocks the traffic then the subscriber will not have access to the content of charge-based service). As such, PGW 220 may place the firewall service before the charge-based service in the sequence of external traffic processing components 240 indicated in the traffic. In addition, PGW 220 may include instructions in the traffic (e.g., in packet headers) for the traffic to skip the charge-based service (e.g., be sent to the next external traffic processing component 240 in the sequence or be sent back to PGW 220) if/when the firewall service modifies the traffic to indicate that PGW 220 is to be blocked. In some embodiments, PGW 220 may analyze a set of traffic processing services corresponding to certain network traffic and determine (based on the analysis) that the order in which external traffic processing components 240 receive and process the traffic may not matter. In such a scenario, PGW 220 may determine the sequence of external traffic processing components 240 by selecting external traffic processing components 240 randomly, arbitrarily, or based on other factors or techniques.

Process 400 may include modifying the traffic to indicate the corresponding sequence of external traffic processing components 240 and a subscriber identity (block 460). For example, PGW 220 may modify the traffic (e.g., by adding header information to individual packets, which may be "supplemental" header information in that the additional header information may be added on top of any existing header information) to include a sequence of IP addresses that corresponds to the sequence of external traffic processing components 240 for providing the traffic processing services to the traffic. Additionally, PGW 220 may modify the traffic (e.g., by adding header information to individual packets) to include the IMSI, or another type of subscriber identity, associated with the subscriber profile of UE 205. As such, PGW 220 may modify the traffic to indicate the sequence of external traffic processing components 240 that are to process the traffic in addition to the subscriber to which the traffic corresponds.

The subscriber identity information (e.g., the IMSI) may enable the external traffic processing components 240 to determine a type, degree, etc., of service to be provided to the traffic. The sequence of external traffic processing components 240 may, in effect, inform each external traffic processing component 240 where the traffic is to be sent after one external traffic processing component 240 has provided the traffic processing service corresponding thereto. In some embodiments, the last IP address in the sequence of external traffic processing components 240 may include the IP address of PGW 220, such that the last external traffic processing component 240 to process the traffic may return the traffic to PGW 220. Alternatively, PGW 220 may include instructions (as a different information element in a packet header or elsewhere) for the last external traffic processing component 240 in the sequence of external traffic processing components 240 to return the traffic to PGW 220.

Figure 5:
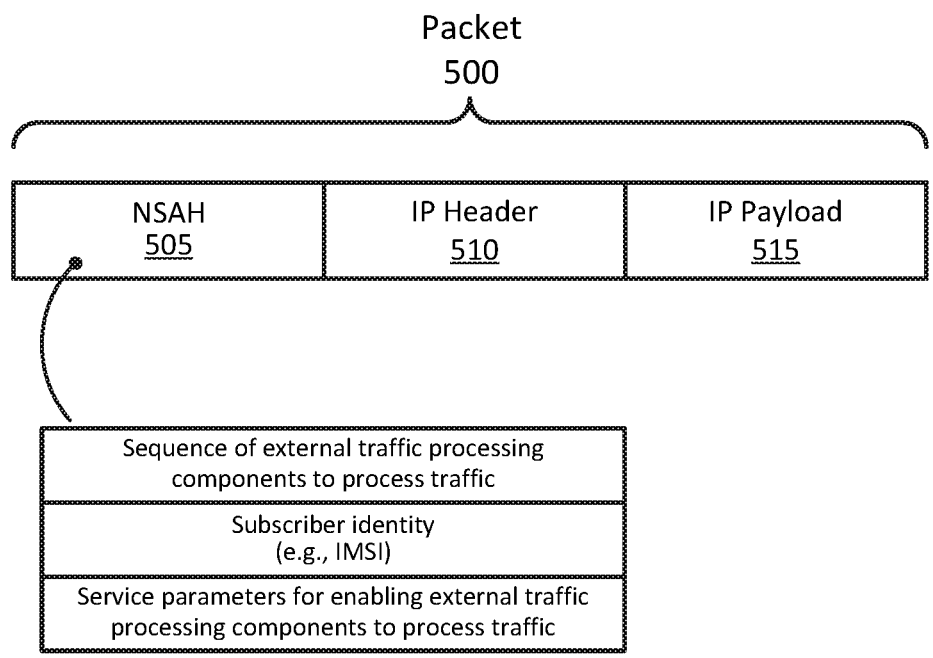
FIG. 5 illustrates an example packet to be sent to a sequence of external traffic processing components.

FIG. 5 illustrates an example packet 500 to be sent to a sequence of external traffic processing components 240. As shown, packet 500 may include NSAH 505, IP header 510, and IP payload 515. NSAH 505 may indicate the sequence of external traffic processing components 240 that are to receive and process the packet in accordance with traffic processing services provided by the external traffic processing components 240, a subscriber identity (e.g., an IMSI of UE 205), and service parameters that may be required by, or otherwise enable, one or more of external traffic processing components 240 to provide the traffic processing service corresponding thereto.

For example, a particular external traffic processing component 240 may provide a firewall service to one or more companies. PGW 220 may determine a company that a particular subscriber may work for, or otherwise be associated with, based on the subscriber profile of the subscriber, which (as explained above) PGW 220 may obtain from HSS 230. When a particular UE 205 with a subscriber profile associated with that company sends or receives traffic, PGW 220 may modify the traffic (e.g., may add an NSAH to one or more packets) to indicate that the external traffic processing component 240 corresponding to the firewall service is to receive the traffic and that the traffic corresponds to a subscriber that is to receive the firewall service. This may be achieved by including an identifier (e.g., a name) of the company in NSAH 505, such that a particular external traffic processing component 240 that implements the firewall service may determine and apply the appropriate firewall service (e.g., appropriate content filter rules, access times, etc.) to the traffic based on the company identifier included in the NSAH. Alternatively, PGW 220 may modify the traffic to include explicit instructions and parameters about what types of firewall service (e.g., appropriate content filter rules, access times, etc.) that the external traffic processing component 240 of the firewall service should apply to the traffic (e.g., in lieu of merely indicating the name of the company).

Returning to FIG. 4, process 400 may include sending the traffic to a first external traffic processing component in the sequence of external traffic processing components 240 (block 470). For example, after modifying the traffic to include the sequence of external traffic processing components 240, the subscriber identity, and service specific information, PGW 220 may forward the traffic to the first external traffic processing component 240 indicated in the sequence of external traffic processing components 240. As described herein, each external traffic processing component 240 of the sequence of external traffic processing components 240 may receive and process the traffic in accordance with the sequence of external traffic processing components 240, and the last external traffic processing component 240 of the sequence of external traffic processing components 240 may return the traffic to PGW 220.

Figure 6:
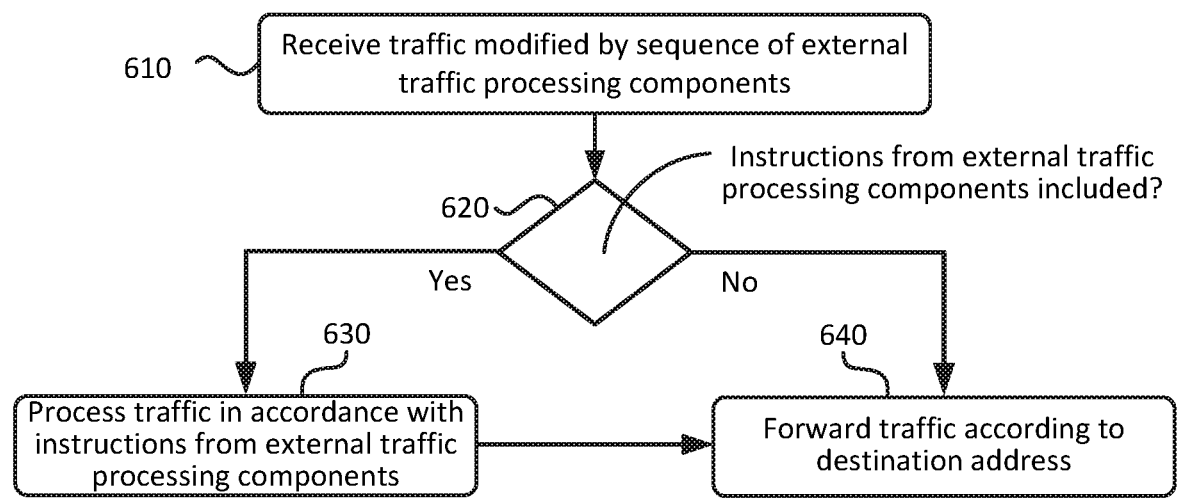
FIG. 6 illustrates an example process for processing traffic received from a sequence of external traffic processing components that provide traffic processing services and operate external to a core network.

FIG. 6 illustrates an example process 600 for processing traffic received from a sequence of external traffic processing components 240 that provide traffic processing services and operate external to a core network. In some embodiments, process 600 may be performed by PGW 220. As such, process 600 is described below with periodic reference to PGW 220 and other devices and networks described above with reference to environment 200 of FIG. 2. Process 600 may also, or alternatively, be performed by another device, such as SMF 320 and/or UPF 335, and may be similarly applicable to other devices of environment 300 of FIG. 3.

As shown, process 600 may include receiving traffic modified by a sequence of external traffic processing components 240 (block 610). For example, PGW 220 may receive traffic that was previously sent to a sequence of external traffic processing components 240 by PGW 220. A description and examples of this is discussed above with reference to process 400 of FIG. 4.

Process 600 may include determining whether the traffic includes instructions from external traffic processing components 240 (block 620). For example, PGW 220 may inspect the traffic to determine whether the traffic includes instructions from one or more external traffic processing components 240 that previously processed the traffic. As described below with reference to FIG. 7, the instructions from external traffic processing components 240 may be included in a packet header (e.g., an NSAH) of one or more packets. For example, as part of the processing performed by one or more external traffic processing components 240 (indicated in a sequence of external traffic processing components 240 in the NSAH of a packet) the processed traffic may include instructions for how the core network (e.g., PGW 220) is to handle or otherwise process the traffic.

An example of such a scenario may include an external traffic processing component 240 that provides a content filtering service for a particular subscriber. When the content filtering server determines that traffic should be filtered (e.g., dropped, removed, deleted, etc.), the content filtering service may modify the traffic (e.g., by adding or modifying NSAH information) to include such an indication, instruction, etc. As a result, when PGW 220 receives the traffic, PGW 220 may inspect the traffic, identify the instructions, and process (e.g., drop) the traffic in accordance with the instructions. In some embodiments, external traffic processing component 240 may also, or alternatively, drop, delete, etc., the traffic, which may eliminate the need for PGW 220 to later do so. In such a scenario, external traffic processing component 240 may notify PGW 220 that traffic has been dropped, deleted, etc., so that PGW 220 may operate accordingly (e.g., by providing UE 205 with a notification of the traffic being dropped, deleted, blocked, etc.). In an additional example, external traffic processing component 240 may modify traffic to indicate a particular QoS (e.g., a QoS Class Indicator (QCI)) for the traffic, which may cause PGW 220 to prioritize or de-prioritize the traffic differently than before the traffic was processed by external traffic processing component 240.

Figure 7:
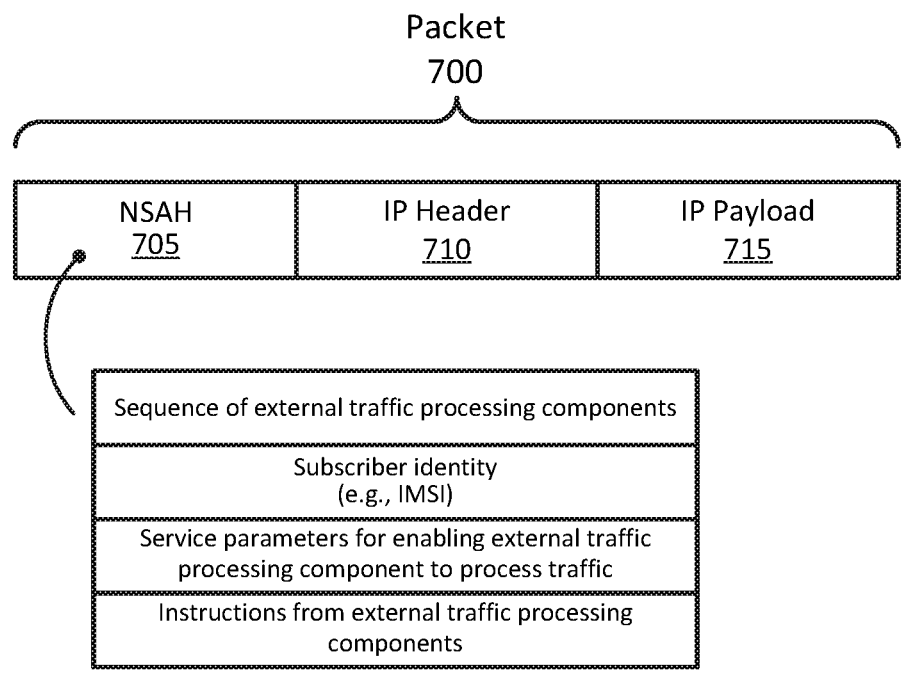
FIG. 7 illustrates an example packet that has been modified by external traffic processing components.

FIG. 7 illustrates an example packet 700 that has been modified by external traffic processing components 240. As shown, packet 700 may include NSAH 705, IP header 710, and IP payload 715. NSAH 705 (i.e., an NSAH as modified by external traffic processing component 240) may include NSAH information originally provided by PGW 220 (e.g., a sequence of external traffic processing components 240, subscriber identity, and/or service parameters), as well as additional information or instructions provided by external processing component 240. In some embodiments, the instructions and/or additional instructions provided by multiple external processing components 240 may be included in NSAH 705.

Referring again to FIG. 6, when the traffic does not include any instructions from external traffic processing components 240 (block 620—No), process 600 may include forwarding the traffic according to the destination address (block 640). For example, when PGW 220 determines that traffic (e.g., one or more packets), received from a sequence of external traffic processing components 240, does not include any instructions with respect to how PGW 220, or other devices of the core network, should process the traffic (e.g., situations where NSAH information, in traffic received from external processing components 240 does not include instructions for PGW 220 to perform any operations), PGW 220 may forward the traffic in accordance with a destination address of the traffic (e.g., a destination IP address of the packet(s)). In some embodiments, prior to forwarding the traffic, PGW 220 may remove, or "strip" any and all NSAH information from the traffic.

When the traffic includes instructions from external traffic processing components 240 (block 620—Yes), process 600 may include processing the traffic in accordance with the instructions (block 630). As mentioned above, when any external traffic processing component 240 processes traffic, the external traffic processing component 240 may modify the traffic (e.g., by adding instructions and/or other information in an NSAH) in such a way that indicates, to PGW 220, how the traffic should be managed, handled, etc., by PGW 220 and/or the core network. As such, PGW 220 may inspect traffic (e.g., NSAH information) received from external traffic processing components 240 for such information and may process the traffic accordingly. To continue with the example discussed above with respect to the filtering service of external traffic processing component 240, PGW 220 may identify an indication, within the traffic, that the traffic should be blocked, deleted, or otherwise disregarded, and may proceed to manage the traffic accordingly. In some embodiments, such an indication or instruction may prompt PGW 220 to apply a related or follow-up procedure, such as notifying UE 205 that traffic (e.g., a request for content) has been block, prohibited, etc., due to the content filtering service.

In some embodiments, external traffic processing component 240 may perform operations on traffic, absent specific instructions from PGW 220 (e.g., without any specific instructions from PGW 220 to process the traffic). For example, assume that according to a particular service, subscription, or policy, a subscriber of UE 205 should not be charged for the transmission of certain traffic (e.g., transmission of the traffic should not be charged against a data usage "cap" associated with the subscriber). Such a situation may occur, for instance, if the traffic is "sponsored" traffic, is subject to promotional billing rates, etc. External traffic processing component may, in some embodiments, identify UE 205 based on the subscriber identity indicated in the NSAH, and/or may perform deep packet inspection (e.g., inspect an IP header and/or payload) to identify whether to perform processing on certain traffic (for instance, whether the traffic is subject to promotional billing rates). In such scenarios, external traffic processing component 240 may indicate (e.g., by providing instructions via the NSAH) to PGW 220 how the traffic should be billed (e.g., at a reduced rate, an increased rate, billed to some other entity, not billed at all, etc.).

As shown, after processing the traffic in accordance with instructions from external traffic processing components 240 (block 630), process 600 may include forwarding the traffic in accordance with a destination address indicated in the traffic (block 640). In scenarios in which, for example, instructions were received for PGW 220 not to forward the traffic, such as the firewall example discussed above, process 600 may not include forwarding the traffic in accordance with the destination address.

Figure 8:
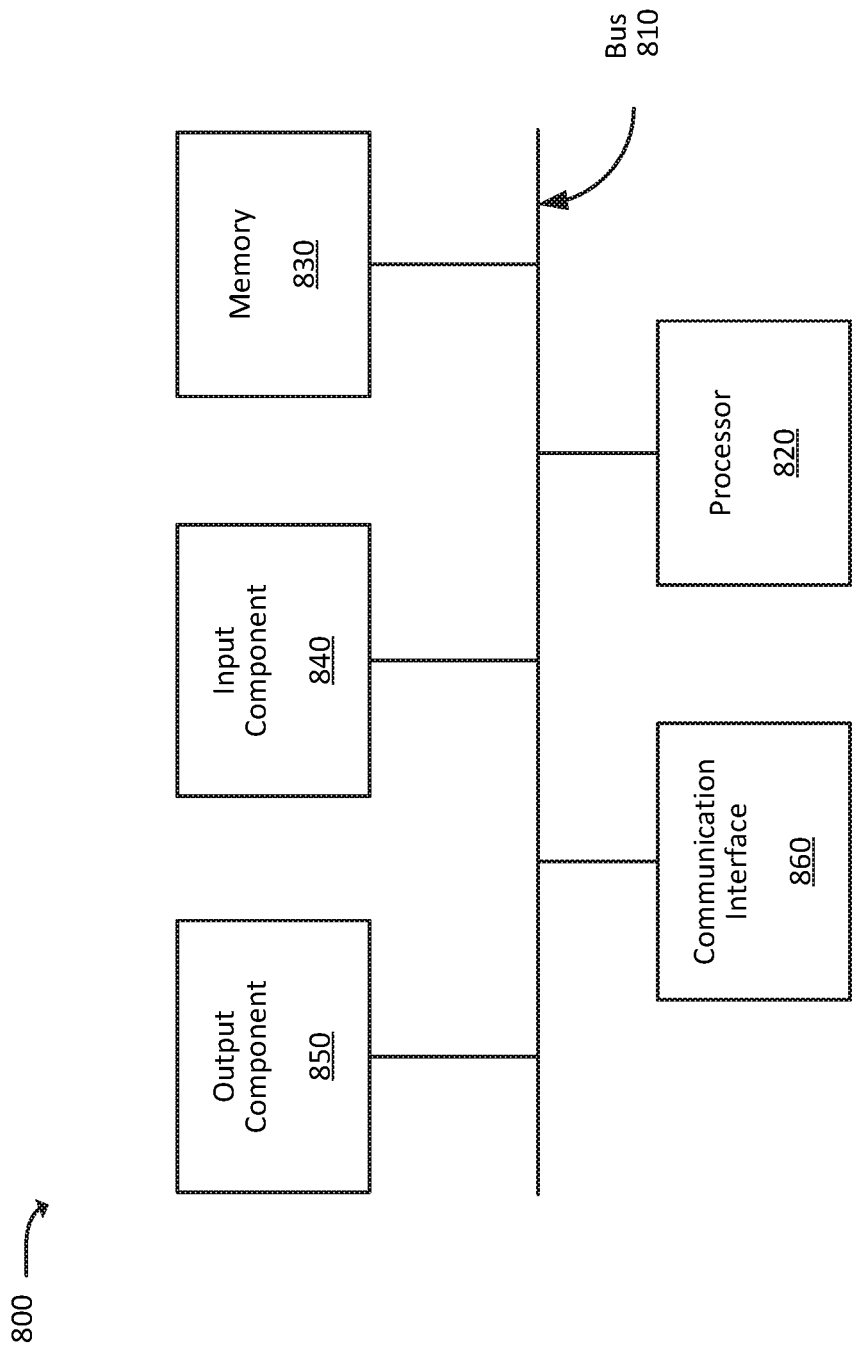
FIG. 8 is a block diagram of example components of a device.

FIG. 8 is a block diagram of example components of a device. Each of the devices illustrated in FIGS. 1A-3 may include one or more devices 800. Device 800 may include bus 810, processor 820, memory 830, input component 840, output component 850, and communication interface 960. In another embodiment, device 800 may include additional, fewer, different, or differently arranged components. As described herein, a component may be implemented by hardware circuitry, software logic, and/or some combination thereof.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a cellular radio, a Bluetooth© radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, embodiments described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope set forth in the claims that follow. The specification and drawings are accordingly to be regarded in an illustrative rather than restrictive sense.

For example, while a series of lines, arrows, and/or blocks have been described regarding FIGS. 4 and 6 the order of the blocks and arrangement of the lines and/or arrows may be modified in other embodiments. Further, non-dependent blocks may be performed in parallel. Similarly, while series of communications have been described with regard to several of the Figures provided herein, the order or nature of the communications may potentially be modified in other embodiments.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operations and behaviors of the aspects that were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner, reflective of the type of information, for example, through various encryption and anonymization techniques for particularly sensitive information.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:
1. A device, comprising:
a non-transitory computer-readable medium storing a set of processor-executable instructions; and
one or more processors configured to execute the set of processor-executable instructions, wherein executing the set of processor-executable instructions causes the one or more processors to:
receive a data packet;
determine one or more traffic processing services to be applied to the data packet based on a subscriber identity associated with the packet;
determine a plurality of external traffic processing components associated with the determined one or more traffic processing services, the plurality of one or more external traffic processing components being external to a core network with which the device is associated;
identify one or more dependencies between two or more external traffic processing components, of the plurality of external traffic processing components;
determine a sequence of the plurality of external traffic processing components based on the one or more dependences between the two or more external traffic processing components;
modify the data packet to indicate the sequence of the plurality of external traffic processing components corresponding to the one or more traffic processing services; and
output the data packet to the plurality of external traffic processing components, wherein the outputting facilitates the one or more traffic processing services by the plurality of external traffic processing components in the determined sequence.

2. The device of claim 1, wherein a first external traffic processing component, of the plurality of external traffic processing components, corresponds to a first traffic processing service that blocks traffic, and wherein a second external traffic processing component, of the plurality of external traffic processing components, corresponds to a second traffic processing service that charges based on accessing the traffic,
 wherein executing the processor-executable instructions, to determine the sequence of the plurality of external traffic processing components, further causes the one or more processors to place, in the sequence, the first external traffic processing component before the second external traffic processing component, based on the first traffic processing service being the service that blocks traffic, and further based on the second external traffic processing service corresponding to the second traffic processing service that charges based on accessing the traffic.

3. The device of claim 1, wherein executing the processor-executable instructions, to determine the sequence of the plurality of external traffic processing components, further causes the one or more processors to:
 determine a sequence of Internet Protocol ("IP") addresses that correspond to the sequence of external traffic processing components; and
 modify, when modifying the data packet to indicate the sequence of the plurality of external traffic processing components, the data packet to indicate the sequence of IP addresses that correspond to the sequence of external traffic processing components.

4. The device of claim 1, wherein executing the processor-executable instructions further causes the one or more processors to:
 apply at least one network rule, corresponding to the core network, to the data packet.

5. The device of claim 4, wherein the at least one network rule is applied to the data packet prior to the data packet being sent to the plurality of external traffic processing components.

6. The device of claim 1, wherein executing the processor-executable instructions further causes the one or more processors to:
 receive the data packet from a last external traffic processing component of the plurality of external traffic processing components;
 determine that the data packet has been modified to include instructions from at least one external traffic processing component, of the plurality of external traffic processing components; and
 apply the instructions to the data packet.

7. The device of claim 4, wherein the at least one network rule is received from at least one of:
 a Policy Charging and Rules Function ("PCRF") associated with the core network, or a Policy Control Function ("PCF") associated with the core network.

8. A non-transitory computer-readable medium, storing a plurality of processor-executable instructions, which, when executed by one or more processors, causes the one or more processors to:
 receive a data packet;
 determine one or more traffic processing services to be applied to the data packet based on a subscriber identity associated with the packet;
 determine a plurality of external traffic processing components associated with the determined one or more traffic processing services, the plurality of external traffic processing components being external to a core network with which the device is associated;
 identify one or more dependencies between two or more external traffic processing components, of the plurality of external traffic processing components;
 determine a sequence of the plurality of external traffic processing components based on the one or more dependences between the two or more external traffic processing components;
 modify the data packet to indicate the sequence of the plurality of external traffic processing components corresponding to the one or more traffic processing services; and
 output the data packet to the plurality of external traffic processing components, wherein the outputting facilitates the one or more traffic processing services by the plurality of external traffic processing components in the determined sequence.

9. The non-transitory computer-readable medium of claim 8, wherein a first external traffic processing component, of the plurality of external traffic processing components, corresponds to a first traffic processing service that blocks traffic, and wherein a second external traffic processing component, of the plurality of external traffic processing components, corresponds to a second traffic processing service that charges based on accessing the traffic,
 wherein the processor-executable instructions, to determine the sequence of the plurality of external traffic processing components, further include processor-executable instructions to place, in the sequence, the first external traffic processing component before the second external traffic processing component, based on the first traffic processing service being service that blocks traffic, and further based on the second external traffic processing service corresponding to the second traffic processing service that charges based on accessing the traffic.

10. The non-transitory computer-readable medium of claim 8, wherein the processor-executable instructions, to determine the sequence of the plurality of external traffic processing components, include processor-executable instructions to:
 determine a sequence of Internet Protocol ("IP") addresses that correspond to the sequence of external traffic processing components; and
 modify, when modifying the data packet to indicate the sequence of the plurality of external traffic processing components, the data packet to indicate the sequence of IP addresses that correspond to the sequence of external traffic processing components.

11. The non-transitory computer-readable medium of claim 8, wherein the processor-executable instructions further include processor-executable instructions to:
 apply at least one network rule, corresponding to the core network, to the data packet.

12. The non-transitory computer-readable medium of claim 11, wherein the at least one network rule is applied to the data packet prior to the data packet being sent to the plurality of external traffic processing components.

13. The non-transitory computer-readable medium of claim 8, wherein the processor-executable instructions further include processor-executable instructions to:
 receive the data packet from a last external traffic processing component of the plurality of external traffic processing components;
 determine that the data packet has been modified to include instructions from at least one external traffic processing component, of the plurality of external traffic processing components; and apply the instructions to the data packet.

14. A method, comprising:

receiving, by a network device, a data packet;

determining, by the network device, one or more traffic processing services to be applied to the data packet based on a subscriber identity associated with the packet;

determining, by the network device, plurality of external traffic processing components associated with the determined one or more traffic processing services, the plurality of external traffic processing components being external to a core network with which the device is associated;

identifying, by the network device, one or more dependencies between two or more external traffic processing components, of the plurality of external traffic processing components;

determining, by the network device, a sequence of the plurality of external traffic processing components based on the one or more dependences between the two or more external traffic processing components;

modifying, by the network device, the data packet to indicate the sequence of the plurality of external traffic processing components corresponding to the one or more traffic processing services; and outputting, by the network device, the data packet to the plurality of external traffic processing components, wherein the outputting facilitates the one or more traffic processing services by the plurality of external traffic processing components in the determined sequence.

15. The method of claim 14, wherein a first external traffic processing component, of the plurality of external traffic processing components, corresponds to a first traffic processing service that blocks traffic, and wherein a second external traffic processing component, of the plurality of external traffic processing components, corresponds to a second traffic processing service that charges based on accessing the traffic, wherein determining the sequence of the plurality of external traffic processing components further includes placing, in the sequence, the first external traffic processing component before the second external traffic processing component, based on the first traffic processing service being service that blocks traffic, and further based on the second external traffic processing service corresponding to the second traffic processing service that charges based on accessing the traffic.

16. The method of claim 14, wherein determining the sequence of the plurality of external traffic processing components includes:

determining a sequence of Internet Protocol ("IP") addresses that correspond to the sequence of external traffic processing components; and modifying, when modifying the data packet to indicate the sequence of the plurality of external traffic processing components, the data packet to indicate the sequence of IP addresses that correspond to the sequence of external traffic processing components.

17. The method of claim 14, further comprising:

applying at least one network rule, corresponding to the core network, to the data packet.

18. The method of claim 17, wherein the at least one network rule is applied to the data packet prior to the data packet being sent to the plurality of external traffic processing components.

19. The method of claim 17, wherein the at least one network rule is received from at least one of:

a Policy Charging and Rules Function ("PCRF") associated with the core network, or a Policy Control Function ("PCF") associated with the core network.

20. The method of claim 14, further comprising:

receiving the data packet from a last external traffic processing component of the plurality of external traffic processing components;

determining that the data packet has been modified to include instructions from at least one external traffic processing component, of the plurality of external traffic processing components; and applying the instructions to the data packet.

* * * * *